United States Patent
Gu et al.

(10) Patent No.: US 8,036,292 B2
(45) Date of Patent: Oct. 11, 2011

(54) SEGMENTED-FRAME SYNCHRONIZATION FOR ISDB-T AND ISDB-TSB RECEIVER

(75) Inventors: Yongru Gu, Lake Forest, CA (US); Philip Treigherman, Newport Beach, CA (US); Chaoliang T. Chen, Irvine, CA (US); Jun Ma, Xian (CN)

(73) Assignee: Newport Media, Inc., Lake Forest, CA (US)

( * ) Notice: Subject to any disclaimer, the term of this patent is extended or adjusted under 35 U.S.C. 154(b) by 764 days.

(21) Appl. No.: 12/131,412

(22) Filed: Jun. 2, 2008

(65) Prior Publication Data
US 2009/0296843 A1 Dec. 3, 2009

(51) Int. Cl.
*H04K 1/10* (2006.01)
*H04L 27/28* (2006.01)

(52) U.S. Cl. ...................................................... 375/260

(58) Field of Classification Search .................. 375/145, 375/147, 236, 240.13, 240.23, 246, 262, 375/193, E7.027, E7.075, E7.145; 348/465, 348/E7.069, E5.108, E5.113; 370/252, 468, 370/522, 203
See application file for complete search history.

(56) References Cited

U.S. PATENT DOCUMENTS

| | | | |
|---|---|---|---|
| 5,598,415 A * | 1/1997 | Nuber et al. | 370/474 |
| 6,931,009 B1 * | 8/2005 | Agarwal | 370/395.1 |
| 7,161,896 B1 * | 1/2007 | Hart et al. | 370/206 |
| 2004/0117716 A1 * | 6/2004 | Shen | 714/776 |
| 2005/0147186 A1 * | 7/2005 | Funamoto et al. | 375/324 |
| 2007/0064588 A1 * | 3/2007 | Kisoda et al. | 370/208 |

* cited by examiner

*Primary Examiner* — David C. Payne
*Assistant Examiner* — Wednel Cadeau
(74) *Attorney, Agent, or Firm* — Rahman LLC

(57) ABSTRACT

A technique for segmented frame synchronization for Integrated Services Digital Broadcasting-Terrestrial (ISDB-T) and Integrated Services Digital Broadcasting-Terrestrial Sound Broadcasting (ISDB-TSB) systems, wherein the method comprises receiving a wireless digital signal comprising an Orthogonal Frequency Division Multiplexing (OFDM) frame, further comprising ODFM symbols, in a receiver and wherein the receiver comprises a time de-interleaver, a bit de-interleaver, and a descrambler; filling memory of time de-interleaver and bit de-interleaver by the received wireless digital signal; determining an OFDM segmented frame boundary when memory of the time de-interleaver and bit de-interleaver are full; decoding bits from time de-interleaver and bit de-interleaver using a Viterbi decoder; outputting the Viterbi decoding bits from time de-interleaver and bit de-interleaver when the OFDM segmented frame boundary is detected; obtaining a segmented multiplexing frame boundary upon receipt of the first bit from the Viterbi decoder; and synchronizing the OFDM frame based on the segmented multiplexing frame boundary.

22 Claims, 3 Drawing Sheets

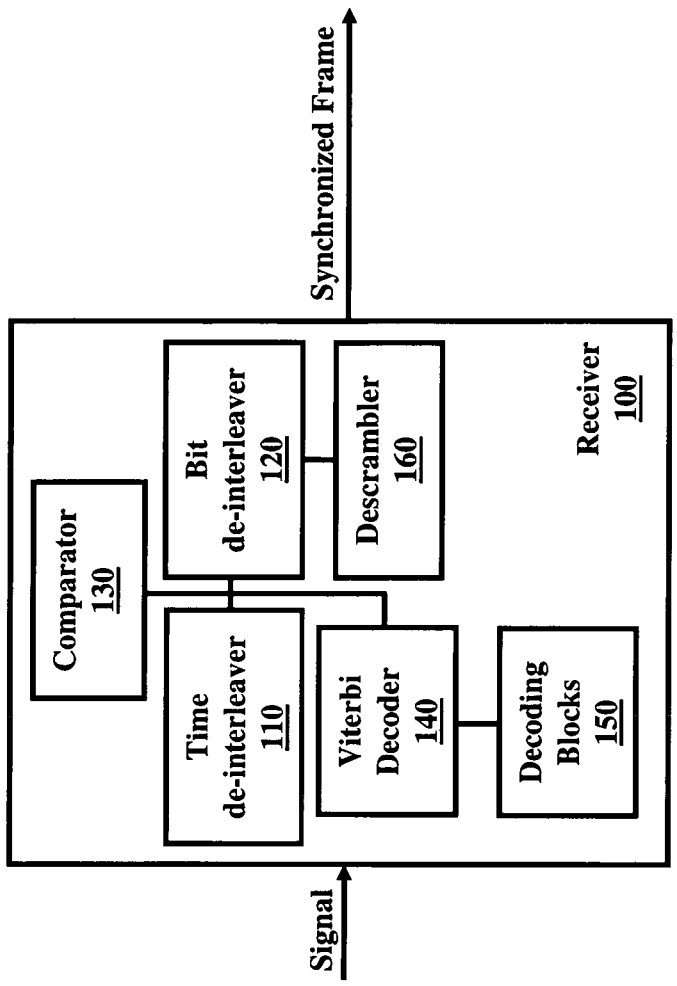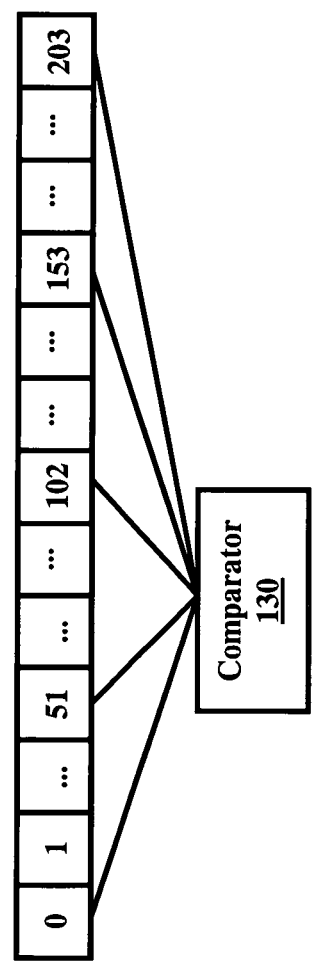

SEGMENTED-FRAME SYNCHRONIZATION FOR ISDB-T AND ISDB-TSB RECEIVER

BACKGROUND

1. Technical Field

The embodiments herein generally relate to wireless communication systems, and, more particularly to Integrated Services Digital Broadcasting-Terrestrial (ISDB-T) and Integrated Services Digital Broadcasting-Terrestrial Sound Broadcasting (ISDB-TSB) systems.

2. Description of the Related Art

In recent years, the wireless industry has seen explosive growth in device capability, especially in relation to mobile devices, such as cell phones, handhelds, gaming consoles, etc. Ever-increasing demand for computing power, memory, and high-end graphic functionalities has accelerated the development of new and exciting wireless services. In the last few years, multiple technologies have been proposed to address the delivery of streaming multimedia to mobile devices.

Multimedia communications provide a rich and immediate environment of image, graphics, sound, text, and interaction through a range of technologies. An example of multimedia communication is streaming multimedia, which is primarily a delivery of continuous synchronized media data. The streaming multimedia is constantly received by, and displayed to, an end user while it is being delivered by a service provider. Multiple technologies such as ISDB-T, Integrated Services Digital Broadcasting-Terrestrial Sound Broadcasting (ISDB-TSB), Terrestrial-Digital Multimedia Broadcasting (T-DMB), Satellite-Digital Multimedia Broadcasting (S-DMB), are used to address the delivery of streaming multimedia to mobile devices. These technologies have typically leveraged upon either third generation cellular/PCS or digital terrestrial TV broadcast technologies.

ISDB, as the name suggests, is used for digital transmission and reception of integrated services, such as television, audio and data services. ISDB includes a variety of transmission standards for broadcasting of satellite, terrestrial, and cable signals. The ISDB transmission system utilized for broadcasting terrestrial digital television signals is termed as ISDB-T and ISDB-TSB.

The ISDB-T and ISDB-TSB systems are based on Orthogonal Frequency Division Multiplexing (OFDM). A number of OFDM segments may constitute a plurality of transmission bands in the ISDB-T and ISDB-TSB transmission systems. The ISDB-T system is enabled to individually set operating parameters of each OFDM segment, thereby enabling a formation of flexible channels. Furthermore, signals in the ISDB-T system are transmitted in the form of symbols having different number of bits based upon the modulation system being used. An OFDM frame consists of 204 symbols having a sufficient guard interval in between to prevent inter-symbol interference effects. Moreover, the ISDB-T system utilizes Moving Pictures Expert Group-2 (MPEG-2) video coding and MPEG-2 Advanced Audio Coding (AAC), thereby enabling a simultaneous transmission of audio, video, and data. The audio, video, and data may be multiplexed to form a single transport scheme for transmission to the receiver. Additionally, a Transmission Multiplexing Configuration Control (TMCC) signal is transmitted with the multiplexed data to other information such as channel segment configuration and transmission parameters.

ISDB-T provides elements in operation and reception that are common to those in digital satellite broadcasting and communications. It also provides flexible multi-program editing for different reception conditions by hierarchical transmission in a transmission channel. The transmission parameters for each hierarchical layer can be selected independently of each other. A transport stream (TS) is re-multiplexed and arranged into data groups (data segments) prior to OFDM framing. In ISDB-T, the transmission parameters of the modulation scheme of OFDM carriers, the coding rates of inner code, and the length of the time interleaving can be independently chosen for each data segment. Hierarchical transmission of ISDB-T is achieved by transmitting OFDM segment groups having different transmission parameters in a channel. A maximum of three layers (three different segment-groups) can be transmitted in one channel at the same time.

Conventionally, the ISDB-T system features three transmission modes, referred to as Mode 1, Mode 2, and Mode 3. Each OFDM segment of the three modes has different number of carriers, thereby enabling the use of wide range of transmitting frequencies for the system. Additionally, the ISDB-T system may be utilized to provide high quality and reliable video, audio, and data broadcasting for fixed as well as mobile receivers.

In a typical environment, frame synchronization is based on the frame boundary, and the receiver does not start data processing and decoding until the frame boundary is detected and synchronized. One of the major problems with this synchronization scheme is long latency. In the worst case, it introduces a latency of almost one frame. One can tell the frame boundary by the OFDM symbol number. In ISDB-T and ISDB-TSB, the symbol number counts from 0, 1, . . . , to 203, and after it reaches 203, it resets and counts from 0, 1, . . . , to 203 again. Symbol number 0 indicates a start of a frame. The receiver monitors the symbol number and when it detects the current symbol number is 0, it starts to perform data processing and decoding. The drawback of this scheme is long latency and long synchronizations. For an end-user, it means more waiting time for video and audio whenever he switches to a new audio/video channel.

SUMMARY

In view of the foregoing, an embodiment herein provides a method for segmented frame synchronization for Integrated Services Digital Broadcasting-Terrestrial (ISDB-T) and Integrated Services Digital Broadcasting-Terrestrial Sound Broadcasting (ISDB-TSB) systems, wherein the method comprises, receiving a wireless digital signal comprising an Orthogonal Frequency Division Multiplexing (OFDM) frame in a receiver wherein the OFDM frame comprises OFDM symbols, and wherein the receiver comprises a time de-interleaver, a bit de-interleaver, and a descrambler; filling memory of the time de-interleaver and the bit de-interleaver by the received wireless digital signal; determining an OFDM segmented frame boundary when memory of the time de-interleaver and the bit de-interleaver are full; decoding bits from the time de-interleaver and the bit de-interleaver using a Viterbi decoder; outputting the Viterbi decoding bits from the time de-interleaver and the bit de-interleaver when the OFDM segmented frame boundary is detected; obtaining a segmented multiplexing frame boundary upon receipt of the first bit from the Viterbi decoder; and synchronizing the OFDM frame based on the segmented multiplexing frame boundary.

Furthermore, the segmented multiplexing frame boundary may comprise a quarter segment. Moreover, the segmented multiplexing frame boundary may comprise a half segment, an eighth segment, or a sixteenth segment. The method further comprises detecting whether a symbol number corresponding to a received OFDM symbol is any of symbol 0, symbol 204/x, symbol **2\*(204/x), and symbol 3\*(204/x), where x is a reciprocal of a segment boundary; wherein if it is detected that the symbol number is any of symbol 0, symbol 204/x, symbol 2\*(204/x), and symbol 3\*(204/x)**, where x is a reciprocal of a segment boundary. The method further comprises determining that the OFDM segmented frame boundary is achieved, wherein the descrambler starts descrambling only at quarter frame multiplexing. The segmented multiplexing frame boundary indicates a start of a transport packet. The method further comprises performing additional decoding on the Viterbi decoded bits upon completion of the outputting process.

Another embodiment includes an apparatus for ISDB-T and ISDB-TSB systems, wherein the apparatus comprises, a processing module for receiving a wireless digital signal comprising an OFDM frame in a receiver wherein the OFDM frame comprises OFDM symbols, and wherein the receiver comprises a time de-interleaver, a bit de-interleaver, and a descrambler; filling memory of the time de-interleaver and the bit de-interleaver by the received wireless digital signal; determining an OFDM segmented frame boundary when memory of the time de-interleaver and the bit de-interleaver are full; decoding bits from the time de-interleaver and the bit de-interleaver using a Viterbi decoder; outputting the Viterbi decoding bits from the time de-interleaver and the bit de-interleaver when the OFDM segmented frame boundary is detected; obtaining a segmented multiplexing frame boundary upon receipt of the first bit from the Viterbi decoder; and synchronizing the OFDM frame based on the segmented multiplexing frame boundary.

Furthermore, the segmented multiplexing frame boundary may comprise a quarter segment. Moreover, the segmented multiplexing frame boundary may comprise a half segment, an eighth segment, or a sixteenth segment. The apparatus further comprises means for detecting whether a symbol number corresponding to a received OFDM symbol is any of symbol 0, symbol 204/x, symbol **2\*(204/x), and symbol 3\*(204/x), where x is a reciprocal of a segment boundary, wherein if it is detected that the symbol number is any of symbol 0, symbol 204/x, symbol 2\*(204/x), and symbol 3\*(204/x)**, where x is a reciprocal of a segment boundary, the apparatus further comprises means for determining that the OFDM segmented frame boundary is achieved; wherein the descrambler starts descrambling only at quarter frame multiplexing. The segmented multiplexing frame boundary indicates a start of a transport packet. The apparatus further comprises means for performing additional decoding on the Viterbi decoded bits upon completion of the outputting process.

Another embodiment includes a system for quarter-frame synchronization for ISDB-T and ISDB-TSB systems, wherein the system comprises a receiver that receives a wireless digital signal comprising an OFDM frame, wherein the OFDM frame comprises OFDM symbols, and wherein the receiver comprises a time de-interleaver, a bit de-interleaver, and a descrambler; means for filling memory of the time de-interleaver and bit de-interleaver by the received wireless digital signal; means for determining an OFDM quarter-frame boundary when the memory of the time de-interleaver and bit de-interleaver are full; a Viterbi decoder that decodes bits from the time de-interleaver and the bit de-interleaver; means for outputting the Viterbi decoding bits from the time de-interleaver and the bit de-interleaver when the OFDM quarter-frame boundary is detected; means for obtaining a quarter-multiplexing frame boundary upon receipt of a first bit from the Viterbi decoder; and means for synchronizing the OFDM frame based on the quarter-multiplexing frame boundary.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1 is an illustration of a block diagram of a receiver according to an embodiment herein;

FIG. 2 illustrates the decoder of FIG. 1 according to an embodiment herein;

DETAILED DESCRIPTION OF PREFERRED EMBODIMENTS

Figure 3:
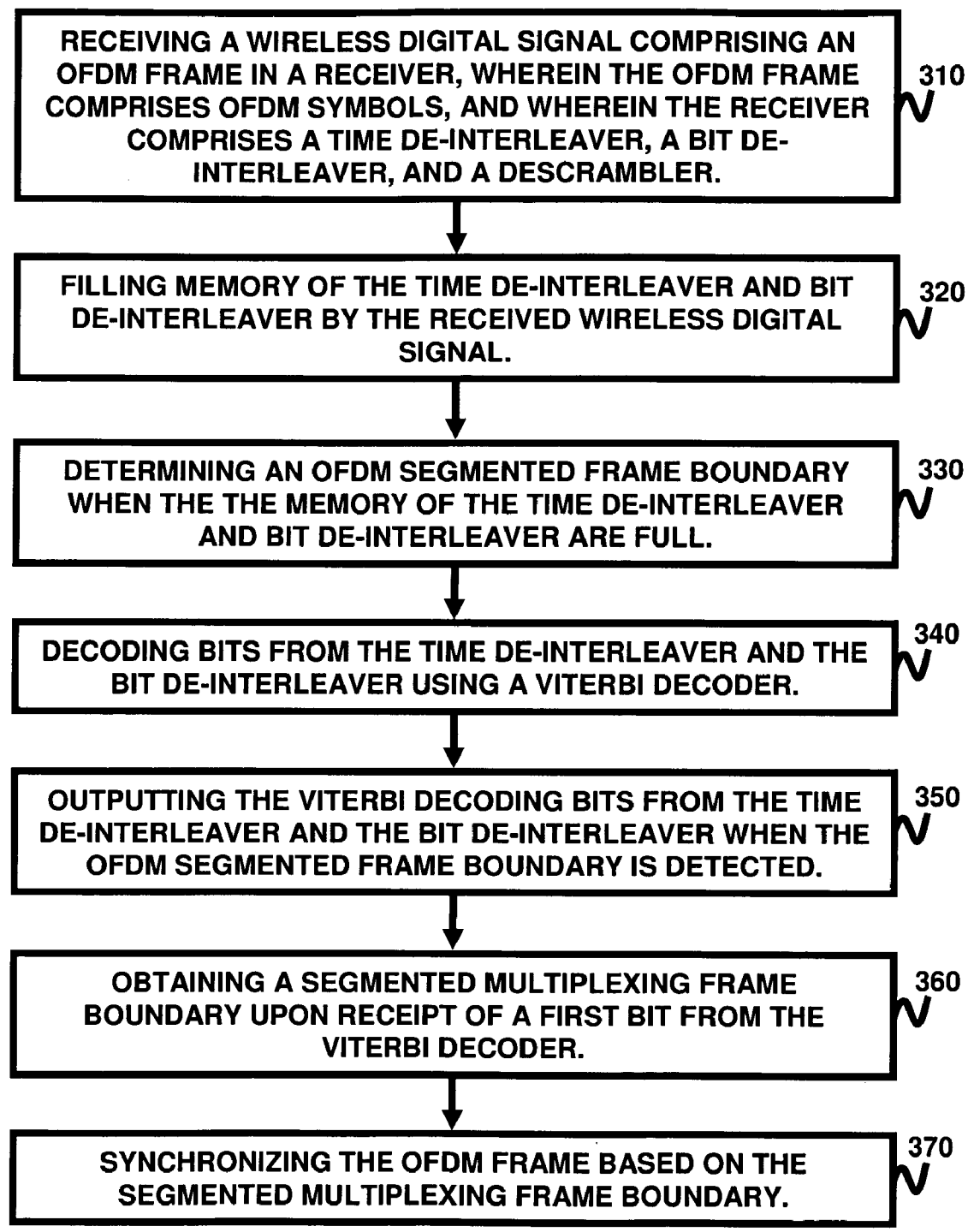
FIG. 3 is a flow diagram illustrating a preferred method according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a method for segmented-frame synchronization for ISDB-T and ISDB-TSB receivers. Referring now to the drawings, and more particularly to FIGS. 1 through 4, where similar reference characters denote corresponding features consistently throughout the figures, there are shown preferred embodiments.

ISDB-T and ISDB-TSB have some unique properties on its frame structure. First, the OFDM frame always aligns with a transport packet (TSP) multiplexing frame. The start of an OFDM frame means the start of a transport packet multiplexing frame. Second, the number of transport packets per frame is always fixed for a fixed modulation and coding rate combination and is always a multiple of four for any combination (modulation: QPSK, 16QAM, and 64QAM and coding rate: ½ or ⅔) that are being supporting. Third, the frame pattern configuration is periodical inside a multiplexing frame, whereby it always repeats itself every quarter frame.

Accordingly, the embodiments provide a segmented frame synchronization scheme, wherein the segment can be a quarter, an eighth, etc. As shown in FIG. 1, the segmented frame synchronization first involves memory filling of a time de-interleaver 110 as well as of a bit-deinterleaver 120 in a receiver 100. In the transmitter side, before the data is transmitted, the data is required to be interleaved. To recover the data at the receiver side, it is needed to perform de-interleaving. Time de-interleaver is a convolutional de-interleaver that feeds data carrier values within an OFDM symbol into delay buffers of varying length; each data carrier is assigned to its own buffer. The carrier values output from the time de-interleaver are fed to the modulation symbol de-mapper, where, based on the type of modulation (QPSK, 16QUAM, 64QUAM), each carrier value is de-mapped to respectively 2, 4, or 6 bits. These de-mapped bits are fed to the bit de-interleaver where, depending on the modulation type, each bit is assigned to its own delay buffer of a given length (respectively 2 delay buffers of sizes 120 and 0; 4 delay buffers of sizes 120, 80, 40, 0; and 6 delay buffers of sizes 120, 96, 72, 48, 24, 0). When wireless digital signal containing OFDM symbols comprising ISDB-T and ISDB-TSD structure properties are received at the receiver 100, memory space of the time de-interleaver 110 and bit de-interleaver 120 are filled with the received digital signal. When the memory of both de-interleavers 110, 120 are full, the embodiments herein look for the OFDM quarter frame boundary. Here, it is determined whether the current symbol number is symbol 0, symbol 51, symbol 102, or symbol 153. Conversely, conventional solutions just look for symbol 0. If it is detected (using comparator 130 of FIG. 2) that the current symbol number is 0, 51, 102, or 153, it is determined that a segmented frame boundary is achieved.

When the segmented frame boundary is detected, the Viterbi decoded bits are output from a Viterbi decoder 140 and are propagated to subsequent decoding blocks 150. The first bit from the Viterbi decoder 140 indicates the segmented (e.g., quarter) multiplexing frame boundary, and also indicates the start of a transport packet. The first byte output from the bit de-interleaver 120 to a descrambler 160 is also at the segmented (e.g., quarter) multiplexing frame boundary, and so the descrambler 160 does not have to start descrambling from any arbitrary state. This simplifies the design of the descrambler 160. Likewise, the first output packet from each layer will be also at the segmented (e.g., quarter) multiplexing frame boundary, and makes a hierarchical combiner (the opposite of hierarchical division) easy to design. In ISDB-T and ISDB-TSB, there could be up to three layers. The data is transmitted through these layers. According to the embodiments herein the receiver supports up to two layers. In ISDB-T, a television broadcasting signal band consists of 13 segments, which are simply sub-bands (or specific frequency ranges). Each layer corresponds to a certain set of segments. For example, the embodiments explained herein support a single-layer transmission, which corresponds to 1 segment of out 13; or two-layer transmission, which corresponds to 3 segments out of 13. The OFDM frame is synchronized based on the segmented multiplexing frame boundary. The comparator 130 compares whether current symbol number is 0, 51, 102, or 153.

FIG. 3, with reference to FIGS. 1 and 2, is a flow diagram illustrating a method of segmented frame synchronization for ISDB-T and ISDB-TSB systems, according to an embodiment herein, wherein the method comprises, receiving (310) a wireless digital signal comprising an OFDM frame in a receiver 100 wherein the OFDM frame comprises OFDM symbols, and wherein the receiver comprises a time de-interleaver 110, a bit de-interleaver 120, and a descrambler 160; filling (320) memory of the time de-interleaver 110 and the bit de-interleaver 120 by the received wireless digital signal; determining (330) an OFDM segmented frame boundary when memory of the time de-interleaver 110 and the bit de-interleaver 120 are full; decoding (340) bits from the time de-interleaver 110 and the bit de-interleaver 120 using a Viterbi decoder 140; outputting (350) the Viterbi decoding bits from the time de-interleaver 110 and the bit de-interleaver 120 when the OFDM segmented frame boundary is detected; obtaining (360) a segmented multiplexing frame boundary upon receipt of the first bit from the Viterbi decoder 140; and synchronizing (370) the OFDM frame based on the segmented multiplexing frame boundary.

Furthermore, in one embodiment, the segmented multiplexing frame boundary comprises a quarter segment. Moreover, in alternate embodiments, the segmented multiplexing frame boundary comprises a half segment, an eighth segment, or a sixteenth segment. The method further comprises detecting whether a symbol number corresponding to a received OFDM symbol is any of symbol 0, symbol 204/x, symbol **2*(204/x), and symbol 3*(204/x), where x is a reciprocal of a segment boundary; wherein if it is detected that the symbol number is any of symbol 0, symbol 204/x, symbol 2*(204/x), and symbol 3*(204/x), where x is a reciprocal of a segment boundary. The method further comprises determining that the OFDM segmented frame boundary is achieved, wherein the descrambler starts descrambling only at quarter frame multiplexing. The segmented multiplexing frame boundary indicates a start of a transport packet. The method further comprises performing additional decoding on the Viterbi 140** decoded bits upon completion of the outputting process.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
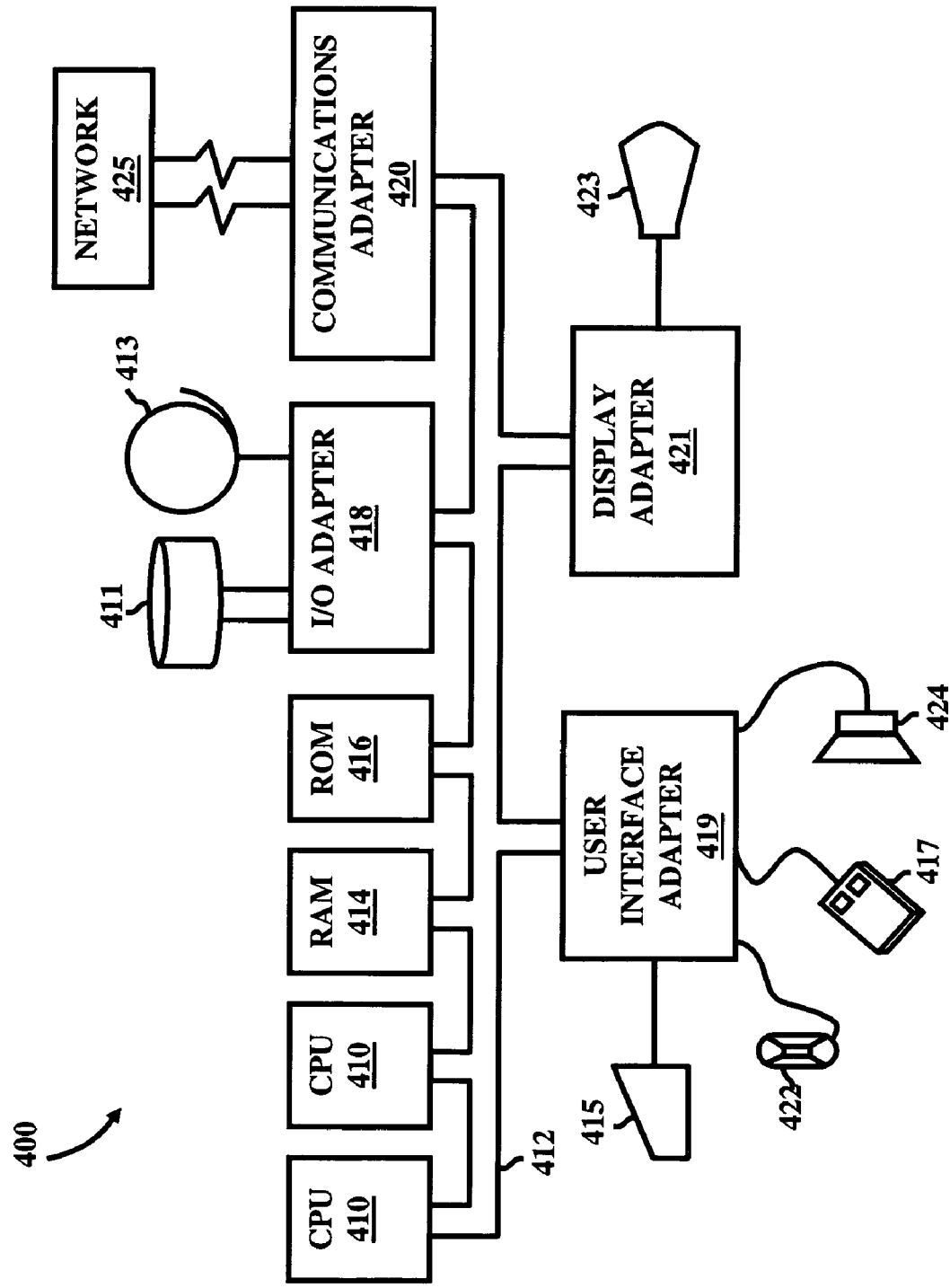
FIG. 4 illustrates a schematic diagram of a computer architecture used in accordance with the embodiments herein.

A representative hardware environment for practicing the embodiments herein is depicted in FIG. 4. This schematic drawing illustrates a hardware configuration of an information handling/computer system 400 in accordance with the embodiments herein. The system 1 comprises at least one processor or central processing unit (CPU) 410. The CPUs 410 are interconnected via system bus 412 to various devices such as a random access memory (RAM) 414, read-only memory (ROM) 416, and an input/output (I/O) adapter 418. The I/O adapter 418 can connect to peripheral devices, such as disk units 411 and tape drives 413, or other program storage devices that are readable by the system 400. The system 400 can read the inventive instructions on the program storage devices and follow these instructions to execute the methodology of the embodiments herein. The system further includes a user interface adapter 419 that connects a keyboard 415, mouse 417, speaker 424, microphone 422, and/or other user interface devices such as a touch screen device (not shown) to the bus 412 to gather user input. Additionally, a communication adapter 420 connects the bus 412 to a data processing network 425, and a display adapter 421 connects the bus 412 to a display device 423 which may be embodied as an output device such as a monitor, printer, or transmitter, for example.

The embodiments herein use simple hardware which is easy for implementation and fast synchronization (less waiting when you switch an ISDBT TV channel). The embodiments herein may be used for any application which has ISDBT/ISDB-TSB receivers. The embodiments herein provide a technique utilizing the unique properties of ISDB-T and ISDB-TSB for reducing the latency of frame synchronization by 75%. For example, in mode 3 and guard ¼, the embodiments herein can save synchronization time by 193 ms if the method with quarter frame synchronization is used. In the embodiment with ⅛ frame synchronization, the saving could be of 224 ms. Moreover, the embodiments herein provide quicker synchronization of the received wireless digital data.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of segmented frame synchronization for Integrated Services Digital Broadcasting-Terrestrial (ISDB-T) and Integrated Services Digital Broadcasting-Terrestrial Sound Broadcasting (ISDB-TSB) systems, said method comprising:
receiving a wireless digital signal comprising an Orthogonal Frequency Division Multiplexing (OFDM) frame in a receiver, wherein said OFDM frame comprises OFDM symbols, and wherein said receiver comprises a time de-interleaver, a bit de-interleaver, and a descrambler;
filling memory of said time de-interleaver and bit de-interleaver by said received wireless digital signal;
determining an OFDM segmented frame boundary when the said memory of said time de-interleaver and bit de-interleaver are full;
decoding bits from said time de-interleaver and said bit de-interleaver using a Viterbi decoder;
outputting the Viterbi decoding bits from said time de-interleaver and said bit de-interleaver when said OFDM segmented frame boundary is detected;
obtaining a segmented multiplexing frame boundary upon receipt of a first bit from said Viterbi decoder; and
synchronizing the OFDM frame based on the segmented multiplexing frame boundary.

2. The method of claim 1, wherein said segmented multiplexing frame boundary comprises a quarter segment.

3. The method of claim 1, wherein said segmented multiplexing frame boundary comprises a half segment, an eighth segment, or a sixteenth segment.

4. The method of claim 1, further comprising detecting whether a symbol number corresponding to a received OFDM symbol is any of symbol 0, symbol 204/x, symbol 2*(204/x), and symbol 3*(204/x), where x is a reciprocal of a segment boundary.

5. The method of claim 4, wherein if it is detected that said symbol number is any of symbol 0, symbol 204/x, symbol 2*(204/x), and symbol 3*(204/x), where x is a reciprocal of a segment boundary, said method further comprising determining that said OFDM segmented frame boundary is achieved.

6. The method of claim 2, wherein said descrambler starts descrambling only at quarter frame multiplexing.

7. The method of claim 1, wherein said segmented multiplexing frame boundary indicates a start of a transport packet.

8. The method of claim 1, further comprising performing additional decoding on the Viterbi decoded bits upon completion of the outputting process.

9. An apparatus for segmented frame synchronization for Integrated Services Digital Broadcasting-Terrestrial (ISDB-T) and Integrated Services Digital Broadcasting- Terrestrial Sound Broadcasting (ISDB-TSB) systems, said apparatus comprising:
  a receiver that receives a wireless digital signal comprising an Orthogonal Frequency Division Multiplexing (OFDM) frame, wherein said OFDM frame comprises OFDM symbols;
  a time de-interleaver comprising memory that is filled by said received wireless digital signal;
  a bit de-interleaver comprising memory that is filled by said received wireless digital signal;
  a detector that determines a location of an OFDM segmented frame boundary when the said memory of said time de-interleaver and bit de-interleaver are full;
  a Viterbi decoder that decodes bits from said time de-interleaver and said bit de-interleaver, wherein Viterbi decoding bits are output from said time de-interleaver and said bit de-interleaver when said OFDM segmented frame boundary is detected, and wherein a segmented multiplexing frame boundary is obtained upon receipt of a first bit from said Viterbi decoder; and
  a processor that synchronizes the OFDM frame based on the segmented multiplexing frame boundary.

10. The apparatus of claim 9, wherein said segmented multiplexing frame boundary comprises a quarter segment.

11. The apparatus of claim 9, wherein said segmented multiplexing frame boundary comprises a half segment, an eighth segment, or a sixteenth segment.

12. The apparatus of claim 9, wherein said detector detects whether a symbol number corresponding to a received OFDM symbol is any of symbol 0, symbol 204/x, symbol 2*(204/x), and symbol 3*(204/x), where x is a reciprocal of a segment boundary.

13. The apparatus of claim 12, wherein if said detector detects that said symbol number is any of symbol 0, symbol 204/x, symbol 2*(204/x), and symbol 3*(204/x), where x is a reciprocal of a segment boundary, said processor determines that said OFDM segmented frame boundary is achieved.

14. The apparatus of claim 10, further comprising a descrambler that starts descrambling only at quarter frame multiplexing.

15. The apparatus of claim 9, wherein said segmented multiplexing frame boundary indicates a start of a transport packet.

16. The apparatus of claim 9, further comprising means for performing decoding on the Viterbi decoded bits that are output from said time de-interleaver and said bit de-interleaver.

17. A system for quarter-frame synchronization for Integrated Services Digital Broadcasting-Terrestrial (ISDB-T) and Integrated Services Digital Broadcasting- Terrestrial Sound Broadcasting (ISDB-TSB) systems, said system comprising:
  a receiver that receives a wireless digital signal comprising an Orthogonal Frequency Division Multiplexing (OFDM) frame, wherein said OFDM frame comprises OFDM symbols, and wherein said receiver comprises a time de-interleaver, a bit de-interleaver, and a descrambler;
  means for filling memory of said time de-interleaver and bit de-interleaver by said received wireless digital signal;
  means for determining an OFDM quarter-frame boundary when the said memory of said time de-interleaver and bit de-interleaver are full;
  a Viterbi decoder that decodes bits from said time de-interleaver and said bit de-interleaver;
  means for outputting the Viterbi decoding bits from said time de-interleaver and said bit de-interleaver when said OFDM quarter-frame boundary is detected;
  means for obtaining a quarter-multiplexing frame boundary upon receipt of a first bit from said Viterbi decoder; and
  means for synchronizing the OFDM frame based on the quarter-multiplexing frame boundary.

18. The system of claim 17, further comprising means for detecting whether a symbol number corresponding to a received OFDM symbol is any of symbol 0, symbol 204/x, symbol 2*(204/x), and symbol 3*(204/x), where x is a reciprocal of a segment boundary.

19. The system of claim 18, wherein if it is detected that said symbol number is any of symbol 0, symbol 204/x, symbol 2*(204/x), and symbol 3*(204/x), where x is a reciprocal of a segment boundary, said system further comprising means for determining that said OFDM segmented frame boundary is achieved.

20. The system of claim 17, wherein said descrambler starts descrambling only at quarter frame multiplexing.

21. The system of claim 17, wherein said segmented multiplexing frame boundary indicates a start of a transport packet.

22. The system of claim 17, further comprising means for performing additional decoding on the Viterbi decoded bits upon completion of the outputting of the Viterbi decoding bits from said time de-interleaver and said bit de-interleaver.

* * * * *